US009190186B2

United States Patent
Sugiyama et al.

(10) Patent No.: US 9,190,186 B2
(45) Date of Patent: Nov. 17, 2015

(54) NEGATIVE-ELECTRODE ACTIVE MATERIAL FOR NONAQUEOUS-ELECTROLYTE SECONDARY BATTERY PRODUCTION PROCESS FOR THE SAME, NEGATIVE ELECTRODE FOR NONAQUEOUS-ELECTROLYTE SECONDARY BATTERY, AND NONAQUEOUS-ELECTROLYTE SECONDARY BATTERY

(71) Applicant: KABUSHIKI KAISHA TOYOTA JIDOSHOKKI, Kariya-shi, Aichi (JP)

(72) Inventors: Yusuke Sugiyama, Kariya (JP); Tomohiro Niimi, Kariya (JP); Masataka Nakanishi, Kariya (JP); Hirotaka Sone, Kariya (JP); Kazuhito Kawasumi, Kariya (JP); Masakazu Murase, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 0 days.

(21) Appl. No.: 14/391,911

(22) PCT Filed: Apr. 10, 2013

(86) PCT No.: PCT/JP2013/002442
§ 371 (c)(1),
(2) Date: Oct. 10, 2014

(87) PCT Pub. No.: WO2013/153807
PCT Pub. Date: Oct. 17, 2013

(65) Prior Publication Data
US 2015/0076399 A1 Mar. 19, 2015

(30) Foreign Application Priority Data
Apr. 13, 2012 (JP) ................................. 2012-091863

(51) Int. Cl.
*H01B 1/22* (2006.01)
*H01M 4/38* (2006.01)
(Continued)

(52) U.S. Cl.
CPC .. *H01B 1/04* (2013.01); *H01B 1/22* (2013.01); *H01M 4/364* (2013.01); *H01M 4/38* (2013.01);
(Continued)

(58) Field of Classification Search
CPC ........... H01B 1/04; H01B 1/22; H01M 4/134; H01M 4/04; H01M 4/362; H01M 4/1393; H01M 4/625
See application file for complete search history.

(56) References Cited

U.S. PATENT DOCUMENTS

RE43,794 E    11/2012 Kim et al.
2007/0077490 A1    4/2007 Kim et al.
(Continued)

FOREIGN PATENT DOCUMENTS

JP    2007-87956 A    4/2007
JP    4281099 B2    6/2009
(Continued)

OTHER PUBLICATIONS

Toshinori Sugimoto, et al., "Application of bis(fluorosulfonyl)imide-based ionic liquid electrolyte to silicon-nickel-carbon composite anode for lithium-ion batteries", Journal of Power Sources, 2010, pp. 6153-6156, vol. 195, No. 18.
(Continued)

*Primary Examiner* — Mark Kopec
(74) *Attorney, Agent, or Firm* — Sughrue Mion, PLLC

(57) ABSTRACT

Providing a negative-electrode active material for nonaqueous-electrolyte secondary battery, the negative-electrode active material enabling an output characteristic to upgrade, a production process for the same, a negative electrode for nonaqueous-electrolyte secondary battery, and a nonaqueous-electrolyte secondary battery. The negative-electrode active material includes an Si-metal-carbon composite composed of: a metal/carbon composite matrix including at least one metal selected from the group consisting of Cu, Fe, Ni, Ti, Nb, Zn, In and Sn, at least one member selected from the group consisting of N, O, P and S, and amorphous carbon; and nanometer-size Si particles dispersed in the metal/carbon composite matrix.

7 Claims, 7 Drawing Sheets

(51) Int. Cl.
*H01B 1/04* (2006.01)
*H01M 4/36* (2006.01)
*H01M 4/587* (2010.01)
*H01M 4/60* (2006.01)
*H01M 10/0525* (2010.01)

(52) U.S. Cl.
CPC .............. *H01M 4/386* (2013.01); *H01M 4/587* (2013.01); *H01M 4/60* (2013.01); *H01M 4/604* (2013.01); *H01M 10/0525* (2013.01)

(56) References Cited

U.S. PATENT DOCUMENTS

| | | | |
|---|---|---|---|
| 2010/0176337 A1* | 7/2010 | Zhamu et al. | 252/182.1 |
| 2010/0266902 A1* | 10/2010 | Takano et al. | 429/231.95 |
| 2011/0311873 A1 | 12/2011 | Schulz et al. | |
| 2012/0007028 A1 | 1/2012 | Hwang et al. | |
| 2012/0164531 A1 | 6/2012 | Chen et al. | |
| 2014/0023928 A1* | 1/2014 | Jeon et al. | 429/220 |

FOREIGN PATENT DOCUMENTS

| | | |
|---|---|---|
| JP | 2011-134534 A | 7/2011 |
| JP | 2011-527982 A | 11/2011 |
| JP | 2012-169259 A | 9/2012 |
| WO | 2011/112042 A2 | 9/2011 |

OTHER PUBLICATIONS

Sukeun Yoon, et al., "Electrochemical properties of Si—Zn—C composite as an anode material for lithium-ion batteries", Journal of Power Sources, 2007, pp. 520-523, vol. 167, No. 2.
International Search Report for PCT/JP2013/002442 dated Jul. 30, 2013 [PCT/ISA/210].

* cited by examiner

NEGATIVE-ELECTRODE ACTIVE MATERIAL FOR NONAQUEOUS-ELECTROLYTE SECONDARY BATTERY PRODUCTION PROCESS FOR THE SAME, NEGATIVE ELECTRODE FOR NONAQUEOUS-ELECTROLYTE SECONDARY BATTERY, AND NONAQUEOUS-ELECTROLYTE SECONDARY BATTERY

CROSS REFERENCE TO RELATED APPLICATIONS

This application is a National Stage of International Application No. PCT/JP2013/002442, filed on Apr. 10, 2013, which claims priority from Japanese Patent Application No. 2012-091863, filed on Apr. 13, 2012, the contents of all of which are incorporated herein by reference in their entirety.

TECHNICAL FIELD

The present invention relates to a negative-electrode active material for nonaqueous-electrolyte secondary battery, a production process for the same, a negative electrode for nonaqueous-electrolyte secondary battery, and a nonaqueous-electrolyte secondary battery.

BACKGROUND ART

Nonaqueous-electrolyte secondary batteries, such as lithium-ion secondary batteries, lithium secondary batteries and sodium-ion secondary batteries, are secondary batteries having high energy densities and enabling high powers to output. For example, lithium-ion secondary batteries have been used mainly as a power source for portable electronic devices. In addition, lithium-ion secondary batteries are expected to serve as a power source for electric automobiles having been anticipated to prevail from now on. A lithium-ion secondary battery has a battery construction in which the positive electrode and negative electrode are made of an active material being able to sorb (or occlude) and desorb (or release) lithium (Li), respectively. Thus, the lithium-ion secondary battery is operated by lithium ions moving within an electrolytic solution disposed between the two electrodes.

In current lithium-ion secondary batteries, lithium-containing metallic composite oxides, such as lithium-cobalt composite oxides, have been used mainly as an active material for the positive electrode. As for an active material for the negative electrode, carbonaceous materials have been used primarily. A polar plate for the positive electrode, and another polar plate for the positive plate have been fabricated as follows. One of the active materials, and a binder resin, as well as a conductive additive, if needed, are dispersed in a solvent to make a slurry. The resulting slurry is coated onto a metallic foil serving as a current collector. The solvent is removed by drying to form a mixed-agent layer. Thereafter, the current collector with the mixed-agent layer formed is molded to a shape by compressing with a roll pressing machine.

Recently, developments of negative-electrode active materials, which possess charge and discharge capacities excelling the theoretical capacities of carbonaceous materials greatly, have been under way, for use in lithium-ion secondary batteries. For example, silicon-based materials, such as silicon or silicon oxides having higher capacities than do carbonaceous materials, have been investigated.

Silicon-based materials alloyed with lithium are able to possess such a high capacity as 1,000 mAh/g or more. However, when a silicon-based material, like silicon or silicon oxide, is used as a negative-electrode active material, the volume of the negative-electrode active material has been known to expand and contract as being accompanied by the sorbing and desorbing of lithium (Li) in the charging and discharging cycles of lithium-ion secondary battery. Such expansions and contractions of the volume of the negative-electrode active material apply loads to a binding agent performing a role of retaining the negative-electrode active material onto a current collector. The binding agent to which the loads have been applied causes declines in adhesiveness between the negative-electrode active material and the current collector, and destructions in conductive paths within a negative electrode. Moreover, the repetitive expansions and contractions of the volume of the negative-electrode active material generate distortions in the negative electrode. The distortions arisen in the negative electrode cause the negative-electrode active material to be miniaturized, and cause the negative-electrode active material to be eliminated from the negative electrode. Therefore, when a silicon-based material, like silicon or silicon oxide, is used as a negative-electrode active material, the expansions and contractions of the negative-electrode active material result in such a problematic issue that no battery performance, such as initial efficiency, capacity and durability which the silicon-based material is supposed to have inherently, is obtainable.

For the purpose of solving the above problematic issue, adding a buffer to a negative-electrode mixed-agent layer has been investigated in order to inhibit a negative electrode as a whole from changing volumetrically, thereby inhibiting cyclability of the negative electrode from deteriorating. The buffer herein inhibits the negative electrode from suffering volumetric changes resulting from expansions and contractions of the volume of a negative-electrode active material.

For example, in Patent Gazette No. 1, using a negative-electrode active material, in which Si particles and amorphous carbon had been composited, led to successfully upgrading a lithium-ion secondary battery in the cyclability. However, the negative-electrode active material according to Patent Gazette No. 1 had a structure in which the Si particles were buried in the amorphous carbon with low conductivity. Consequently, the present inventors believe the following as concerns over the negative-electrode active material: declines in the lithium-ion conductivity within the negative-electrode active material at the time of charging and discharging the lithium-ion secondary battery, and increments in the battery resistance being accompanied by the declines. Thus, using the negative-electrode active material, in which Si particles and amorphous carbon have been composited, results in such a possibility that an output characteristic of the lithium-ion secondary battery declines.

Patent Gazette No. 1: Japanese Patent Gazette No. 4281099

SUMMARY OF THE INVENTION

Problems to be Solved by the Invention

The present invention is made in view of such circumstances. An object of the present invention is to provide the following: a negative-electrode active material for nonaqueous-electrolyte secondary battery, the negative-electrode active materials being able to upgrade an output characteristic of the nonaqueous-electrolyte secondary battery; a production process for the same; a negative electrode for nonaqueous-electrolyte secondary battery; and a nonaqueous-electrolyte secondary battery.

Means for Achieving the Object

As a result of the present inventors' wholehearted investigations, the present inventors found out that using a negative-electrode active material comprising an Si-metal-carbon composite, in which nanometer-size Si particles are dispersed in a metal/carbon composite matrix containing a metal to lower the electric resistance results in enabling a nonaqueous-electrolyte secondary battery to have an upgraded output characteristic.

That is, a negative-electrode active material for nonaqueous-electrolyte secondary battery according to the present invention comprises an Si-metal-carbon composite composed of a metal/carbon composite matrix including at least one metal selected from the group consisting of Cu, Fe, Ni, Ti, Nb, Zn, In and Sn, at least one member selected from the group consisting of N, O, P and S, and amorphous carbon, nanometer-size Si particles dispersed in the metal/carbon composite matrix.

A preferable content rate of the nanometer-size Si particles is from 10% by mass or more to 80% by mass or less when the Si-metal-carbon composite is taken as 100% by mass.

A preferable metal is Cu, and thereby a preferable Si-metal-carbon composite is composed of an Si—Cu-carbon composite exhibiting a peak in a range where $2\theta$=from 40 deg. to 48 deg. in X-ray diffraction.

A negative electrode for nonaqueous-electrolyte secondary battery according to the present invention comprises the aforementioned negative-electrode active material for nonaqueous-electrolyte secondary battery.

A nonaqueous-electrolyte secondary battery according to the present invention comprises the aforementioned negative electrode for nonaqueous-electrolyte secondary battery.

A production process for negative-electrode active material for nonaqueous-electrolyte secondary battery according to the present invention comprises a raw-material mixing step of mixing nanometer-size Si particles, an organic polymer and an organometallic complex one another to prepare a raw-material mixture, a calcination step of calcining the raw-material mixture at from 300° C. or more to 1,100° C. or less.

A preferable organometallic composite comprises at least one ligand selected from the group consisting of phthalocyanine, porphyrin, cyclopentadienyl, allyl, diene, alkyne, carbene, pinacholate, catecholate, acyl, arene, alkoxide, and amide.

A preferable organometallic composite comprises at least one metal selected from the group consisting of Cu, Fe, Ni, Ti, Nb, Zn, In, and Sn.

A preferable organic polymer is at least one member selected from the group consisting of petroleum-based pitch, coal-based pitch, synthesized pitch, tars, polyvinyl chloride, acrylic resin, polyamide-imide resin, polyamide resin, and polyimide resin.

A preferable compounding rate of the nanometer-size Si particles is from 10% by mass or more to 75% by mass or less when the entirety of the raw-material mixture is taken as 100% by mass.

A negative-electrode active material for nonaqueous-electrolyte secondary battery according to the present invention is formed via the steps of mixing nanometer-size Si particles, polyamide-imide resin and copper phthalocyanine one another to prepare a raw-material mixture, calcining the raw-material mixture at from 300° C. or more to 1,100° C. or less;

the negative-electrode active material comprises an Si—Cu-carbon composite exhibiting a peak in a range where $2\theta$=from 40 deg. to 48 deg. in X-ray diffraction.

Advantages of the Invention

The negative-electrode active material according to the present invention has a structure in which nanometer-size Si particles are dispersed in a metal/carbon composite matrix containing a metal to lower the electric resistance. The metal/carbon composite matrix comprises a predetermined metal, at least one member selected from the group consisting of N, O, P and S, and amorphous carbon. At least one of the N, O, P and S constructs a functional group to be included in the amorphous carbon in the surface or interior. The present inventors presume that the above-mentioned metal is coordination bonded to the aforementioned functional group in a form of metallic ion. Consequently, the metal/carbon composite matrix has a lowered electric resistance, even though the metal/carbon composite matrix includes the amorphous carbon whose electric resistance is high. The metal/carbon composite matrix has a heightened conductivity for lithium ion, so that lithium ions are transmitted satisfactorily even down to the nanometer-size Si particles. Consequently, a nonaqueous-electrolyte secondary battery comprising the aforementioned negative-electrode active material shows a high output characteristic.

In accordance with the production process for negative-electrode active material for nonaqueous-electrolyte secondary battery according to the present invention, the negative-electrode active material for nonaqueous-electrolyte secondary battery according to the present invention is produced readily.

A nonaqueous-electrolyte secondary battery comprising the negative-electrode active material for nonaqueous-electrolyte secondary battery according to the present invention exhibits a high output characteristic.

EXPLANATION ON REFERENCE NUMERALS

Figure 1:
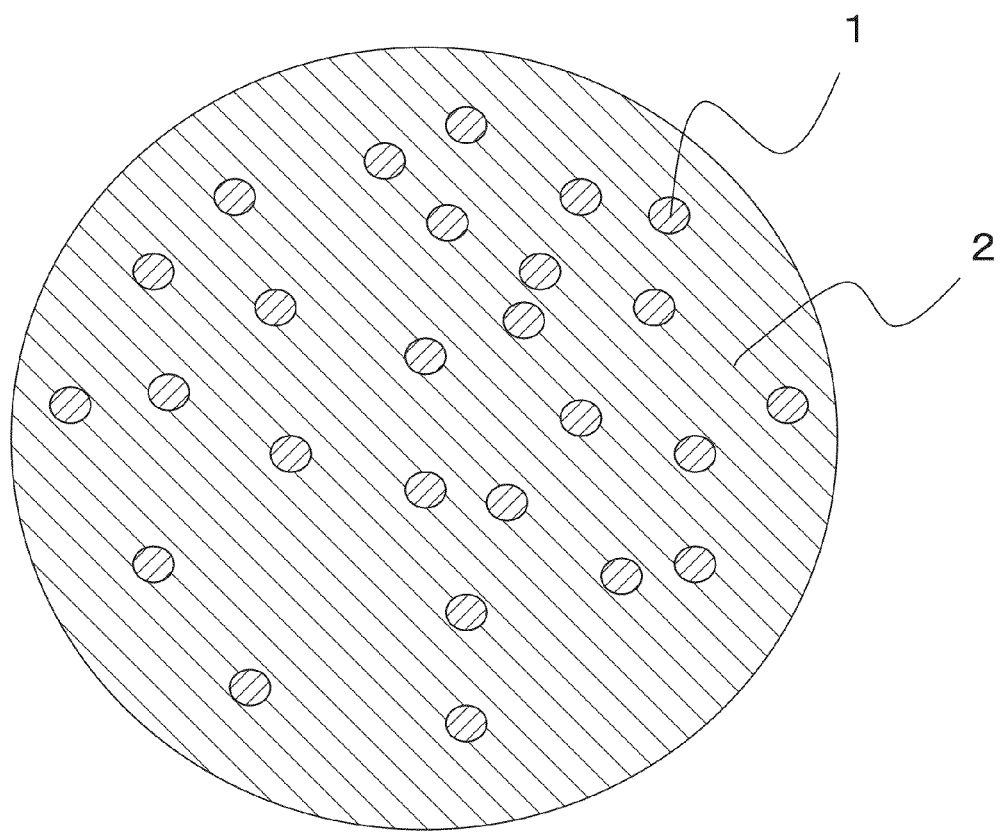
FIG. 1 is a schematic cross-sectional diagram illustrating a negative-electrode active material for nonaqueous-electrolyte secondary battery according to an embodiment of the present invention.

1: Nanometer-size Si Particles; and
2: Metal/Carbon Composite Matrix

DETAILED DESCRIPTION OF THE PREFERRED EMBODIMENTS

Negative-Electrode Active Material for Nonaqueous-Electrolyte Secondary Battery

A negative-electrode active material for nonaqueous-electrolyte secondary battery according to the present invention comprises an Si-metal-carbon composite. The Si-metal-carbon composite is composed of a metal/carbon composite matrix, and nanometer-size Si particles dispersed in the metal/carbon composite matrix.

The metal/carbon composite matrix includes at least one metal selected from the group consisting of Cu, Fe, Ni, Ti, Nb, Zn, In and Sn, at least one member selected from the group consisting of N, O, P and S, and amorphous carbon.

The present inventors presume that the metal/carbon composite matrix contains at least one metal selected from the group consisting of Cu, Fe, Ni, Ti, Nb, Zn, In and Sn in a form of metallic ion. The metal/carbon composite matrix containing the metal has a small electric resistance. Note that at least one metal selected from the group consisting of Cu, Fe, Ni, Ti, Nb, Zn, In and Sn has a high conductivity, even if the metal turns into a form of oxide.

A preferable metal contained in the metal/carbon composite matrix is at least one member selected from the group consisting of Cu, Zn and Sn. Cu, Zn and Sn excel in the conductivity, and turn into metallic ions so that Cu, Zn and Sn are likely to undergo coordination bonding with functional groups that are present in the amorphous carbon. Consequently, the metal/carbon composite matrix including at least one member selected from the group consisting of Cu, Zn and Sn has a more lessened electric resistance, compared with the electric resistance of the metal/carbon composite matrices containing the other metals. In terms of the conductivity, an especially preferable metal is Cu.

At least one member selected from the group consisting of N, O, P and S constructs a functional group included in the amorphous carbon on the surface, or in the interior. And, the present inventors presume that the above-mentioned metal is coordination bonded to such a functional group in a form of metallic ion. The present inventors believe that the functional group formed by at least one of the N, O, P and S has an action of facilitating the coordination bonding between the metallic atom and the amorphous carbon more.

The amorphous carbon functions as a buffer for inhibiting expansion and contractions, which result from charging and discharging operations, in the nanometer-size Si particles. Since the present negative-electrode active material includes the amorphous carbon, the following are inhibited: volumetric expansions and contractions of Si eventually entailing declines in the adhesiveness between the negative-electrode active material and a current collector; destructions of conductive paths within a negative electrode; miniaturizations of the negative-electrode active material; and eliminations of the negative-electrode active material from the negative electrode.

Moreover, the nanometer-size Si particles are dispersed in the metal/carbon composite matrix. Note herein that the clause, "the nanometer-size Si particles are dispersed in the metal/carbon composite matrix," refers to such a phenomenon that the nanometer-size Si particles make contact with the metal/carbon composite matrix with at least some of the outer surfaces. Desirable nanometer-size Si particles make contact with the metal/carbon composite matrix with all of the outer surfaces. In acceptable nanometer-size Si particles, some of the outer surfaces of the nanometer-size Si particles make contact with some of the outer surfaces of the other neighboring nanometer-size Si particles. When the nanometer-size Si particles are mutually put in a noncontact state, the metal/carbon composite matrix, which is present around the nanometer-size Si particles, inhibits expansions and contractions of the nanometer-size Si particles individually. Accordingly, expansion and contractions are likely to be inhibited in the present negative-electrode active material as whole, compared with the other case where the nanometer-size Si particles make contact with each other to turn into an agglomerated state.

The nanometer-size Si particles are dispersed in the metal/carbon composite matrix whose electric resistance is small. Since the electric resistance of the metal/carbon composite material is small, the movement of electrons to the nanometer-size Si particles by way of the metal/carbon composite matrix becomes easy. Moreover, the conductivity of lithium ions to the nanometer-size Si particles by way of the carbon/metal composite particle upgrades as well. Consequently, the alloying between the nanometer-size Si particles and lithium progresses efficiently. Since the contained nanometer-size Si particles function effectively, the inherent battery performance of a nonaqueous-electrolyte secondary battery is demonstrated securely.

Preferable nanometer-size Si particles have a particle diameter of from 1 nm to 100 nm. More preferable nanometer-size Si particles have a particle diameter of 50 nm or less. Setting the particle diameter of Si at a nanometer size leads to decreasing miniaturizations of Si resulting from volumetric expansions and reductions of Si accompanied by charging and discharging operations.

Moreover, an acceptable Si-metal-carbon composite is formed by coating at least one metal selected from the group consisting of Cu, Fe, Ni, Ti, Nb, Zn, In and Sn onto a surface of an Si-carbon composite in which nanometer-size Si particles are dispersed in a carbon matrix including amorphous carbon and at least one member selected from the group consisting of N, O, P and S. In the above case, the carbon matrix is turned into a metal/carbon composite matrix by coating the aforementioned metal onto a surface of the Si-carbon composite. The coating of at least one metal selected from the group consisting Cu, Fe, Ni, Ti, Nb, Zn, In and Sn onto a surface of the Si-carbon composite is carried out by a publicly-known thermal plasma apparatus or publicly-known sputtering apparatus, for instance. Cu is a suitable metal for coating the Si-carbon composite.

FIG. 1 illustrates a schematic cross-sectional diagram of a negative-electrode active material for nonaqueous-electrolyte secondary battery according to an embodiment of the present invention. As shown in FIG. 1, nanometer-size Si particles 1 are dispersed inside a metal/carbon composite matrix 2.

A preferable content rate of the nanometer-size Si particles is from 10% by mass or more to 80% by mass or less when the Si-metal-carbon composite is taken as 100% by mass. When the content rate of the nanometer-size Si particles is less than 10% by mass, no desired battery capacity is obtainable. When the content rate of the nanometer-size Si particles is more than 80% by mass, the metal/carbon composite matrix has difficulty in efficiently inhibiting expansions and contractions of the nanometer-size Si particles. A more preferable content rate of the nanometer-size Si particles is from 40% by mass or more to 80% by mass or less when the Si-metal-carbon composite is taken as 100% by mass.

A preferable metal is Cu, and thereby a preferable Si-metal-carbon composite is composed of an Si—Cu-carbon composite exhibiting a peak in a range where 2θ=from 40 deg. to 48 deg. in X-ray diffraction.

Moreover, a negative-electrode active material for non-aqueous-electrolyte secondary battery according to the present invention is formed via the steps of:

mixing nanometer-size Si particles, polyamide-imide resin and copper phthalocyanine one another to prepare a raw-material mixture; and calcining the raw-material mixture at from 300° C. or more to 1,100° C. or less; the negative-electrode active material comprises:

an Si—Cu-carbon composite exhibiting a peak in a range where 2θ=from 40 deg. to 48 deg. in X-ray diffraction.

The production steps are described in the following section titled "Production Process for Negative-electrode Active Material for Nonaqueous-electrolyte Secondary Battery." The negative-electrode active material for nonaqueous-electrolyte secondary battery according to the present invention comprises an Si—Cu-carbon composite exhibiting a peak in a range where 2θ=from 40 deg. to 48 deg. in X-ray diffraction. The peak in a range where 2θ=from 40 deg. to 48 deg. is neither the peaks of copper and copper alloy nor the peaks of Si, SiC and C. Although the present inventors believe that the peak in a range where 2θ=from 40 deg. to 48 deg. is a peak resulting from Cu that has been taken in inside carbon as a complex, the belief has not been definite yet. The present inventors presume that Cu is coordination bonded as copper ions to functional groups, which are present on a surface or interior of the amorphous carbon, within the copper/carbon composite matrix.

(Production Process for Negative-Electrode Active Material for Nonaqueous-Electrolyte Secondary Battery)

The above-mentioned negative-electrode active material for nonaqueous-electrolyte secondary battery is produced by a production process described below.

A production process for negative-electrode active material for nonaqueous-electrolyte secondary battery according to the present invention comprises:

a raw-material mixing step of mixing nanometer-size Si particles, an organic polymer and an organometallic complex one another to prepare a raw-material mixture; and a calcination step of calcining the raw-material mixture at from 300° C. or more to 1,100° C. or less.

The present inventors believe that calcining an organic polymer at 300° C. or more turns the organic polymer into amorphous carbon having a functional group including at least one member selected from the group consisting of N, O, P and S in the surface or interior. The present inventors believe that calcining an organic substance in the organometallic complex at 300° C. or more also turns the organic substance into amorphous carbon. There also arises such a case where the amorphous carbon derived from the organometallic complex has a functional group including at least one of the N, O, P and S in the surface or interior. Moreover, the present inventors believe that calcining the organometallic complex and organic polymer all together leads to coordination bonding metallic ions inside the organometallic complex to functional groups of the amorphous carbon derived from the organic polymer, and/or functional groups of the amorphous carbon derived from the organometallic complex. Therefore, at least one of the N, O, P and S is included in either one of the organic polymer and organometallic complex at least. The raw-material mixture is calcined at a calcination temperature up to 1,100° C. Within the calcination-temperature range, the nanometer-size Si particles do not undergo alloying with other metals or carbon, so that the nanometer-size Si particles keep existing as nanometer-size Si particles.

A preferable organometallic complex comprises at least one ligand selected from the group consisting of phthalocyanine, porphyrin, cyclopentadienyl, allyl, diene, alkyne, carbene, pinacholate, catecholate, acyl, arene, alkoxide, and amide. The organometallic complex comprising such a ligand is soluble in organic solvents. Moreover, even when the organometallic complex comprising the aforementioned ligand is mixed with the organic polymer, the resulting mixture is soluble in organic solvents. In addition, a preferable organometallic complex comprises a ligand composed of a planar ligand. Since the planar ligand is a planar molecule, parts in amorphous carbon derived from the planar ligand are likely to make parts in which electricity is likely to flow. As the ligand composed of a planar ligand, phthalocyanine, or porphyrin is given.

A preferable organometallic complex comprises at least one metal selected from the group consisting of Cu, Fe, Ni, Ti, Nb, Zn, In, and Sn. These metals have a high conductivity. Consequently, when the organometallic complex includes at least one of the metals, the post-calcination amorphous carbon turns into conductive amorphous carbon. Moreover, the metals are likely to soluble in organic solvents, so that the metals are likely to turn into complexes. A more preferable organometallic complex comprises at least one metal selected from the group consisting of Cu, Zn, and Sn. Cu, Zn and Sn excel in the conductivity, and are likely to undergo coordination bonding with the functional groups of the amorphous carbon. Consequently, including at least one metal selected from the group consisting of Cu, Zn and Sn leads to making resultant amorphous carbon, which has been made by calcining the organometallic complex, conductive with ease. An especially preferable organometallic complex comprises Cu.

As such an organometallic complex, for example, as an organometallic complex including Cu, the following are given: copper phthalocyanine, copper acetate, copper alkoxide, copper dithiane, copper trifuluoromethane sulfonate, copper trifluoromethane acetate, Cu-TMEDA complexes, copper diketonate, copper acetonate, copper-salt pyridine complexes, alcian blue complexes, copper-salt ethylenediamine complexes, or copper quinoline complexes, and the like.

A preferable organic polymer is at least one member selected from the group consisting of petroleum-based pitch, coal-based pitch, synthesized pitch, tars, polyvinyl chloride, acrylic resin, polyamide-imide resin, polyamide resin, and polyimide resin. The organic polymers are soluble in organic solvents. Moreover, the organic polymers dissolve in organic solvents along with the organometallic complex. A more preferable organic polymer is polyamide-imide resin, and/or polyimide resin. The polyamide-imide resin and polyimide resin exhibit thermoplasticity. Consequently, amorphous carbon formed by calcining the polyamide-imide resin or polyimide resin has high toughness. The amorphous carbon with high toughness inhibits expansions and contractions of the nanometer-size Si particles more effectively than does amorphous carbon with low toughness.

When the entire raw-material mixture is taken as 100% by mass, a preferable compounding rate of the nanometer-size Si particles is from 10% by mass or more to 75% by mass or less. When the compounding rate of the nanometer-size Si particles is less than 10% by mass, no desired battery capacity is obtainable. When the compounding rate of the nanometer-size Si particles is more than 75% by mass, the metal/carbon composite matrix does not efficiently inhibit expansions and contractions of the nanometer-size Si particles. A more preferable compounding rate of the nanometer-size Si particles is from 40% by mass or more to 70% by mass or less.

Negative Electrode for Nonaqueous-Electrolyte Secondary Battery

A negative electrode for nonaqueous-electrolyte secondary battery according to the present invention comprises the aforementioned negative-electrode active material for nonaqueous-electrolyte secondary battery. Adopting the negative electrode comprising the aforementioned negative-electrode active material for nonaqueous-electrolyte secondary battery results in a nonaqueous-electrolyte secondary battery exhibiting large charge and discharge capacities.

The negative electrode is made by adhering a negative-electrode active-material layer, which is made by binding the aforementioned negative-electrode active material together with a binding agent, onto a current collector.

The current collector is referred to as a chemically-inert highly-electron-conductive conductor for keeping electric currents flowing between opposite electrodes while charging and discharging a nonaqueous-electrolyte secondary battery. As a material used for the current collector, metallic materials, such as stainless steels, titanium, nickel, aluminum and copper; or conductive resins are given. Moreover, the current collector takes on forms, such as foils, sheets and films. Consequently, as the current collector, metallic foils, such as copper foils, nickel foils, aluminum foils and stainless-steel foils, are used suitably, for instance.

A preferable thickness of the current collector is from 1 μm to 200 μm. An allowable current collector also has an oxidized surface. A permissible current collector even has a surface covered with another metals, metallic oxides or carbon, and so on.

An acceptable negative-electrode active-material layer further includes a conductive additive. The negative electrode is fabricated by the following process. A composition is prepared in order to form the negative-electrode active-material layer including the negative-electrode active material and the binding agent, as well as a conductive additive, if needed. An appropriate solvent is further added to the aforementioned composition to turn the composition into a slurry-like substance. The slurry-like substance is coated onto a surface of the current collector, and is thereafter dried. The post-drying current collector is compressed in order to enhance the electrode density, if needed. Thus, the negative electrode is fabricated.

As for a method for coating the composition for forming the negative-electrode active-material layer, publicly-known conventional methods, such as roll coating methods, dip coating methods, doctor blade methods, spray coating methods and curtain coating methods, are usable.

As a solvent for viscosity adjustment, N-methyl-2-pyrrolidone (or NMP), methanol, methyl isobutyl ketone (or MIBK), and the like, are employable.

The binding agent plays a role of fastening the negative-electrode active material and conductive additive together onto the current collector. As the binding agent, the following are usable, for instance: fluorine-containing resins, such as polyvinylidene fluoride, polytetrafluoroethylene and fluorinated rubber; thermoplastic resins, such as polypropylene and polyethylene; imide-based resins, such as polyimide and polyamide-imide; or alkoxysilyl group-containing resins.

The conductive additive is added in order to enhance the conductivity of the negative electrode. As the conductive additive, one of the following is employed independently, or two or more members of the following are combined to employ: carbon black, graphite, acetylene black (or AB), KETJENBLACK (or KB), and gas-phase-method carbon fibers (or vapor grown carbon fibers (or VGCF)), namely, carbonaceous fine particles; or nickel flakes and copper flakes, namely, metallic fine particles. Although an employment amount of the conductive additive is not at all restrictive especially, the employment amount is set, for example, at from 20 to 100 parts by mass approximately when taking active materials, which are contained in the negative electrode, as 100 parts by mass.

Nonaqueous-Electrolyte Secondary Battery

In addition to the above-mentioned negative electrode for nonaqueous-electrolyte secondary battery, the nonaqueous-electrolyte secondary battery according to the present invention uses a positive electrode, a separator, and an electrolytic solution, as the battery constituent elements.

The positive electrode comprises a current collector, and a positive-electrode active-material layer bound onto a surface of the current collector. The positive-electrode active-material layer includes a positive-electrode active material, and a binding agent, as well as a conductive additive, if needed. The current collector, the binding agent, and the conductive additive are the same as the counterparts in the above-described negative electrode.

As for the positive-electrode active material, a lithium-containing compound is appropriate. For example, lithium-containing metallic composite oxides, such as lithium-cobalt composite oxides, lithium-nickel composite oxides and lithium-manganese composite oxides, are usable. Moreover, other metallic compounds, or polymeric materials are usable as the positive-electrode active material. As the other metallic compounds, the following are given: oxides, such as titanium oxide, vanadium oxide and manganese dioxide; or disulfides, such as titanium sulfide and molybdenum sulfide. As for the polymeric materials, the following are given, for instance: conductive polymers, such as polyaniline and polythiophene; or organic compounds having a quinone structure.

In particular, a preferable positive-electrode active material includes a composite metallic oxide expressed by a general formula: $Li_xCo_pNi_qMn_rO_2$ (where $0.8<"x"<1.5$; $"p"+"q"+"r"=1$; $0<"p"<1$; $0≤"q"<1$; and $0≤"r"<1$). Since the aforementioned composite oxide excels in the thermal stability and is of low cost, including the aforementioned composite metallic oxide results in obtaining an inexpensive nonaqueous-electrolyte secondary battery exhibiting good thermal stability.

As the aforementioned composite metallic oxide, $LiCo_{1/3}Ni_{1/3}Mn_{1/3}O_2$, $LiNi_{0.6}Co_{0.2}Mn_{0.2}O_2$, $LiNi_{0.5}Co_{0.2}Mn_{0.3}O_2$, $LiCoO_2$, or $LiNi_{0.8}Co_{0.2}O_2$ is usable, for instance. Even among the composite metallic oxides, $LiCo_{1/3}Ni_{1/3}Mn_{1/3}O_2$ is preferable in terms of the thermal stability.

The separator is one of the constituent elements making lithium ions pass therethrough while isolating the positive electrode and negative electrode from one another and preventing the two electrodes from contacting with each other to result in electric-current short-circuiting. As the separator, the following are usable, for instance: porous membranes made of synthetic resins, such as polytetrafluoroethylene, polypropylene, polyimide or polyethylene; or porous membranes made of ceramics. Being a separator, in which a synthetic-resin membrane is combined with a ceramic membrane, is of no concern at all.

The electrolytic solution includes a solvent, and an electrolyte dissolved in the solvent.

As far as the solvent dissolves an electrolyte therein and enabling Li to move between opposite electrodes, what structure the solvent has does not matter at all. As the solvent, cyclic esters, linear esters, or ethers are employable. As the cyclic esters, the following are employable, for instance: ethylene carbonate, propylene carbonate, butylene carbonate, gamma-butyrolactone, vinylene carbonate, 2-methyl-gamma-butyrolactone, acetyl-gamma-butyrolactone, and gamma-valerolactone. As the linear esters, the following are employable, for instance: dimethyl carbonate, diethyl carbonate, dibutyl carbonate, dipropyl carbonate, ethyl methyl carbonate, alkyl propionate ester, dialkyl malonate ester, and alkyl acetate ester. As the ethers, the following are employable, for instance: tetrahydrofuran, 2-methyltetrahydrofuran, 1,4-dioxane, 1,2-dimethoxyethane, 1,2-diethoxyethane, and 1,2-dibutoxyethane.

As the electrolyte to be dissolved in the aforementioned electrolytic solution, a lithium salt, such as $LiClO_4$, $LiAsF_6$, $LiPF_6$, $LiBF_4$, $LiCF_3SO_3$ or $LiN(CF_3SO_2)_2$, is employable, for instance.

As the electrolytic solution, employing a solution, in which a lithium salt, such as $LiClO_4$, $LiPF_6$, $LiBF_4$ or $LiCF_3SO_3$, is dissolved in a concentration of from 0.5 mol/L to 1.7 mol/L approximately in a solvent, such as ethylene carbonate, dimethyl carbonate, propylene carbonate or diethyl carbonate, is preferable.

Since the nonaqueous-electrolyte secondary battery according to the present invention comprises the aforementioned negative electrode for nonaqueous-electrolyte secondary battery, the present nonaqueous-electrolyte secondary battery exhibits large charge and discharge capacities.

An allowable vehicle has the nonaqueous-electrolyte secondary battery according to the present invention on-board. Since the present nonaqueous-electrolyte secondary battery exhibits large charge and discharge capacities, a vehicle having the present nonaqueous-electrolyte secondary battery onboard makes a high-performance vehicle in terms of outputting high powers. A permissible vehicle is vehicles making use of electric energies produced by the present nonaqueous-electrolyte secondary battery for all or some of the power source. As the vehicle, the following are given, for instance: electric automobiles, hybrid automobiles, plug-in hybrid automobiles, hybrid railroad vehicles, industrial vehicles like forklifts, electric wheelchairs, electrically-power-assisted bicycles, and electrically-powered two-wheeled vehicles.

Having been described so far are the embodiment modes of the negative-electrode active material for nonaqueous-electrolyte secondary battery according to the present invention, the present production process for the same, the present negative electrode for nonaqueous-electrolyte secondary battery, and the present nonaqueous-electrolyte secondary battery. However, the present invention is not an invention which is limited to the aforementioned embodying modes. The present invention is executable in various modes, to which changes or modifications that one of ordinary skill in the art carries out are made, within a range not departing from the gist of the present invention.

Embodiment

The present invention is hereinafter described concretely, while giving an embodiment thereof.

Manufacture of Coin-Type Lithium-Ion Secondary Battery

Nanometer-size Si particles (produced by HAMAMATSU NANOTECHNOLOGY Co., Ltd.) with 50-nm average particle diameter was readied as nanometer-size Si particles. Polyamide-imide resin produced by SIGMA-ALDRICH JAPAN Limited Liability Company was readied. Copper phthalocyanine produced by SIGMA-ALDRICH JAPAN Limited Liability Company was readied.

First Embodiment 50-part-by-mass nanometer-size Si particles, 10-part-by-mass polyamide-imide resin, and 10-part-by-mass copper phthalocyanine were weighed out. The nanometer-size Si particles, polyamide-imide resin, and copper phthalocyanine were added to 30-part-by-mass N-methyl-2-pyrrolidone (or NMP produced by SIGMA-ALDRICH JAPAN Limited Liability Company). The resulting mixture was put in an agate mortar, and was then kneaded. The resultant kneaded substance was dried at 100° C. for 1 hour, thereby removing the NMP from the kneaded substance.

The kneaded substance from which the NMP had been excluded was heated at 800° C. for 1 hour under an argon atmosphere, thereby obtaining an Si—Cu-carbon composite according to First Embodiment. When the Si—Cu-carbon composite according to First Embodiment was taken as 100% by mass, a content rate of the nanometer-size Si particles was about 60% by mass. The content rate of the nanometer-size Si particles was computed by actually measuring the value by a compositional analysis via the energy dispersive X-ray (or EDX) spectroscopy.

The obtained Si—Cu-carbon composite was mixed with acetylene black (produced by SIGMA-ALDRICH JAPAN Limited Liability Company) and polyvinylidene fluoride (or PVDF produced by KUREHA Co., Ltd.) in such a proportion as 82 parts by mass, 3 parts by mass and 15 parts by mass, respectively. The resulting mixture was dispersed in a proper amount of N-methyl-2-pyrrolidone (or NMP), thereby preparing a slurry.

After preparing the aforementioned slurry, the slurry was put on an electrolyzed copper foil with 18-μm thickness, and was formed as a film on the copper plate using a doctor blade. The thus obtained sheet was dried at 80° C. for 20 minutes so that the NMP was removed by volatilization. Thereafter, a current collector comprising the electrolyzed copper foil, and a negative-electrode active-material layer comprising the aforementioned mixture were adhesion joined firmly by a roll pressing machine. The adhesion-joined assembly was punched out with a 1-cm$^2$ circular punch. The punched-out current collector with the negative-electrode active-material layer joined thereon was vacuum dried at 140° C. for 3 hours, thereby turning the assembly into a negative electrode whose thickness was 100 μm or less.

The above-mentioned negative electrode was labeled an electrode for evaluation, and then a coin-type model battery (the CR2032 type) was manufactured within a dry room. The coin-type model battery comprised the following constituent elements, and was manufactured by superimposing the constituent elements one after another and then subjecting the superimposed constituent elements to a crimping process: a solution serving as an electrolytic solution in which 1-mol $LiPF_6$ was dissolved in a mixed solvent of ethylene carbonate (or EC) and diethyl carbonate (or DEC) mixed in such a volumetric ratio as EC:DEC=1:1; a spacer; a 500-μm-thickness Li foil making the counter electrode; a separator ("Celgard #2400 (trademark)" produced by CELGARD Corporation); and the electrode for evaluation. The constituent elements crimped together were labeled a model battery according to First Embodiment.

First Comparative Example

Except that no copper phthalocyanine had not been put in the kneaded substance according to First Embodiment, that is, except that only the nanometer-size Si particles and polyamide-imide resin were kneaded one another in an amount of 50 parts by mass and 20 parts by mass, respectively, an Si-carbon composite according to First Comparative Example was prepared. The thus prepared Si-carbon composite was used to manufacture a model battery according to First Comparative Example.

Observation by SEM

Figure 2:
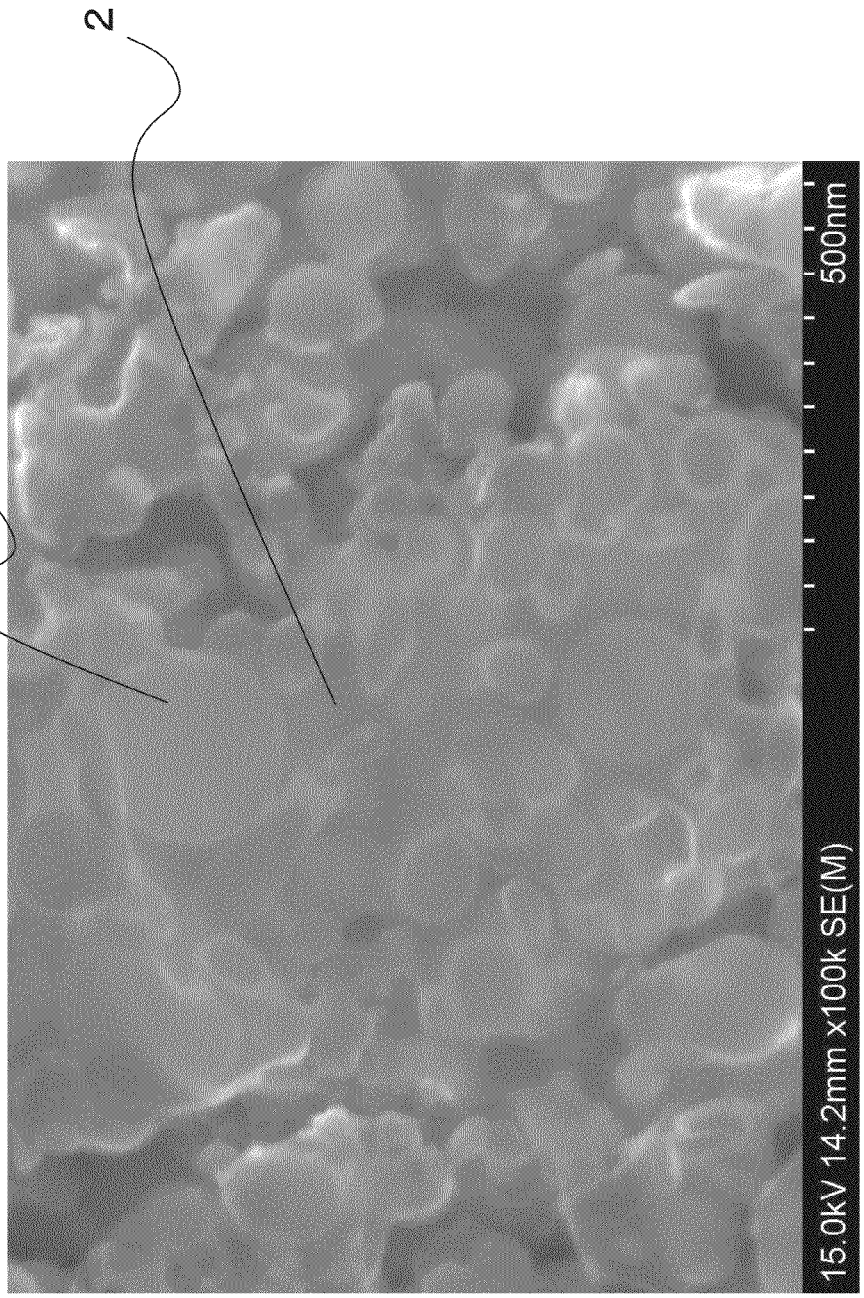
FIG. 2 is an SEM photograph of a cross section of an Si—Cu-carbon composite according to First Embodiment of the present invention.

The present inventors observed a cross section of the Si—Cu-carbon composite according to First Embodiment by a scanning electron microscope (or SEM). FIG. 2 shows an SEM photograph. The present inventors observed from FIG. 2 that nanometer-size Si particles 1 were dispersed in a metal/carbon composite matrix 2.

Analysis of Composition

According to a compositional analysis via the energy dispersive X-ray (or EDX) spectroscopy incorporated into the aforementioned SEM, the present inventors ascertained that the matrix existed around the Si particles. Moreover, the present inventors ascertained that, in addition to carbon, copper was present as one of the constituent elements of the matrix. This fact suggested that the matrix was in a carbon-copper composited state.

Measurement of Raman Spectra

Figure 3:
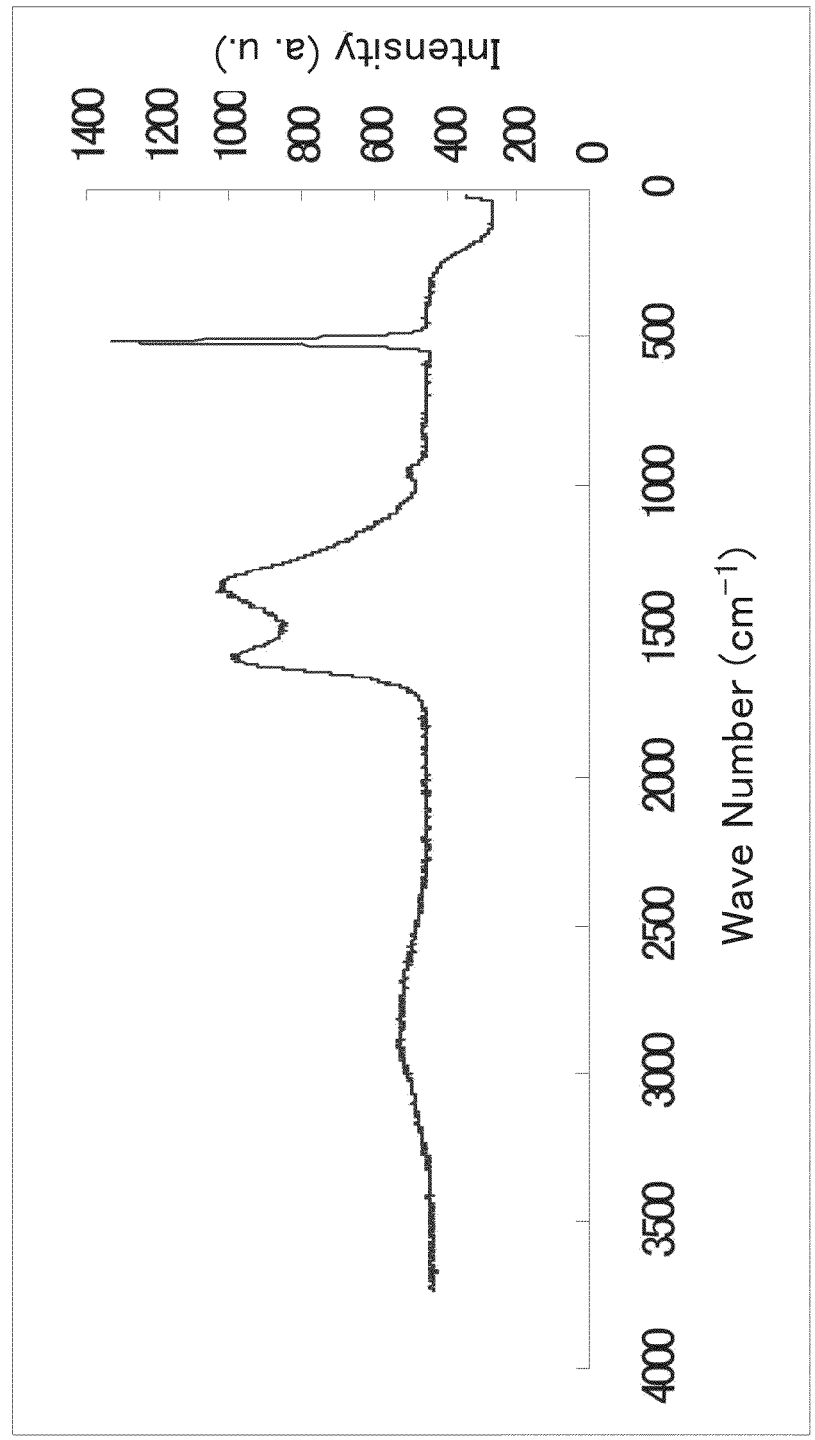
FIG. 3 is a diagram illustrating Raman spectra of the Si—Cu-carbon composite according to First Embodiment of the present invention.
Figure 4:
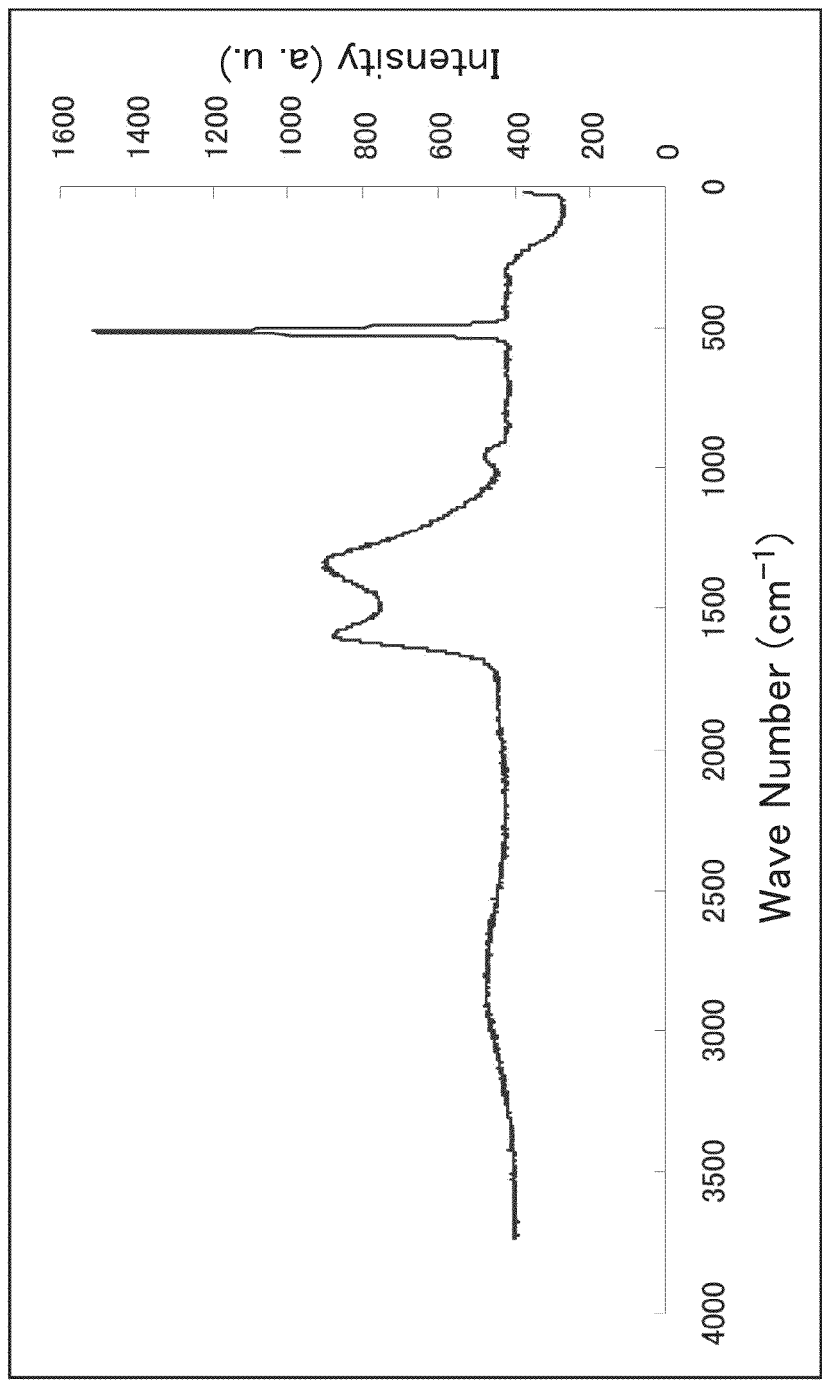
FIG. 4 is a diagram illustrating Raman spectra of an Si-carbon composite according to First Comparative Example of the present invention.

The present inventors measured Raman spectra of the Si—Cu-carbon composite according to First Embodiment, and Raman spectra of the Si-carbon composite according to First Comparative Example, respectively. FIG. 3 illustrates the Raman spectra of the Si—Cu-carbon composite according to First Embodiment, whereas FIG. 4 illustrates the Raman spectra of the Si-carbon composite according to First Comparative Example. The above-described Raman spectra were measured by "RMP-320" produced by JASCO Corporation and having the following specifications: excitation wavelength λ=532 nm; 1,800-gram/mm grating; and 3-$cm^{-1}$ resolution. Note that, in general, Raman spectra show changes in the quantity of peaks, or fluctuations in the position of a peak top, depending on the difference between incident-light wavelengths or resolutions. Therefore, when the Raman spectra of an identical sample are measured by different apparatuses, the same peaks as the above-mentioned peaks are ascertained, or peaks, whose quantity; or peak-top position is distinguished from the quantity or peak-top position of the above-mentioned peaks, are ascertained.

When comparing FIG. 3 with FIG. 4, no difference was found between the Raman spectra of the Si—Cu-carbon composite according to First Embodiment and the Raman spectra of the Si-carbon composite according to First Comparative Example. Thus, the present inventors understood that the presence of Cu did not necessarily result in metamorphosing the basic skeletal structure of carbon. Moreover, in both of First Embodiment and First Comparative Example, the "G" band at around 1,600 $cm^{-1}$ arising from graphite structure, and the "D" band at around 1,350 $cm^{-1}$ arising from amorphous carbon were observed; and broad band shapes were shown as a whole. From the facts, the inventors understood that carbon was amorphous in First Embodiment and First Comparative Example. Moreover, the peak in the vicinity of 500 $cm^{-1}$ found in the Raman spectra of First Embodiment and First Comparative Example indicated Si.

Measurement of X-Ray Diffraction

Figure 5:
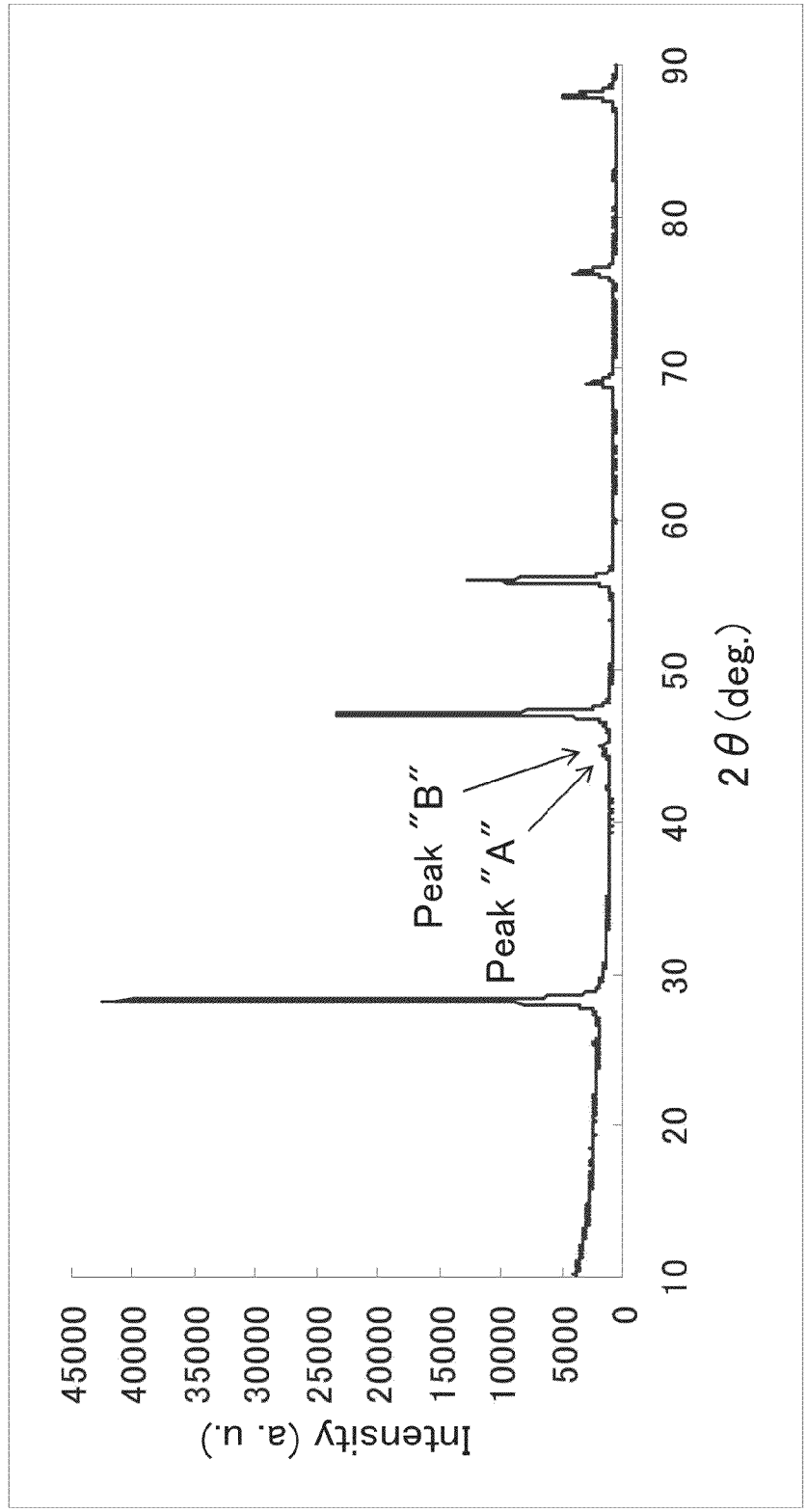
FIG. 5 is a diagram showing results of X-ray diffraction in the Si—Cu-carbon composite according to First Embodiment of the present invention.
Figure 6:
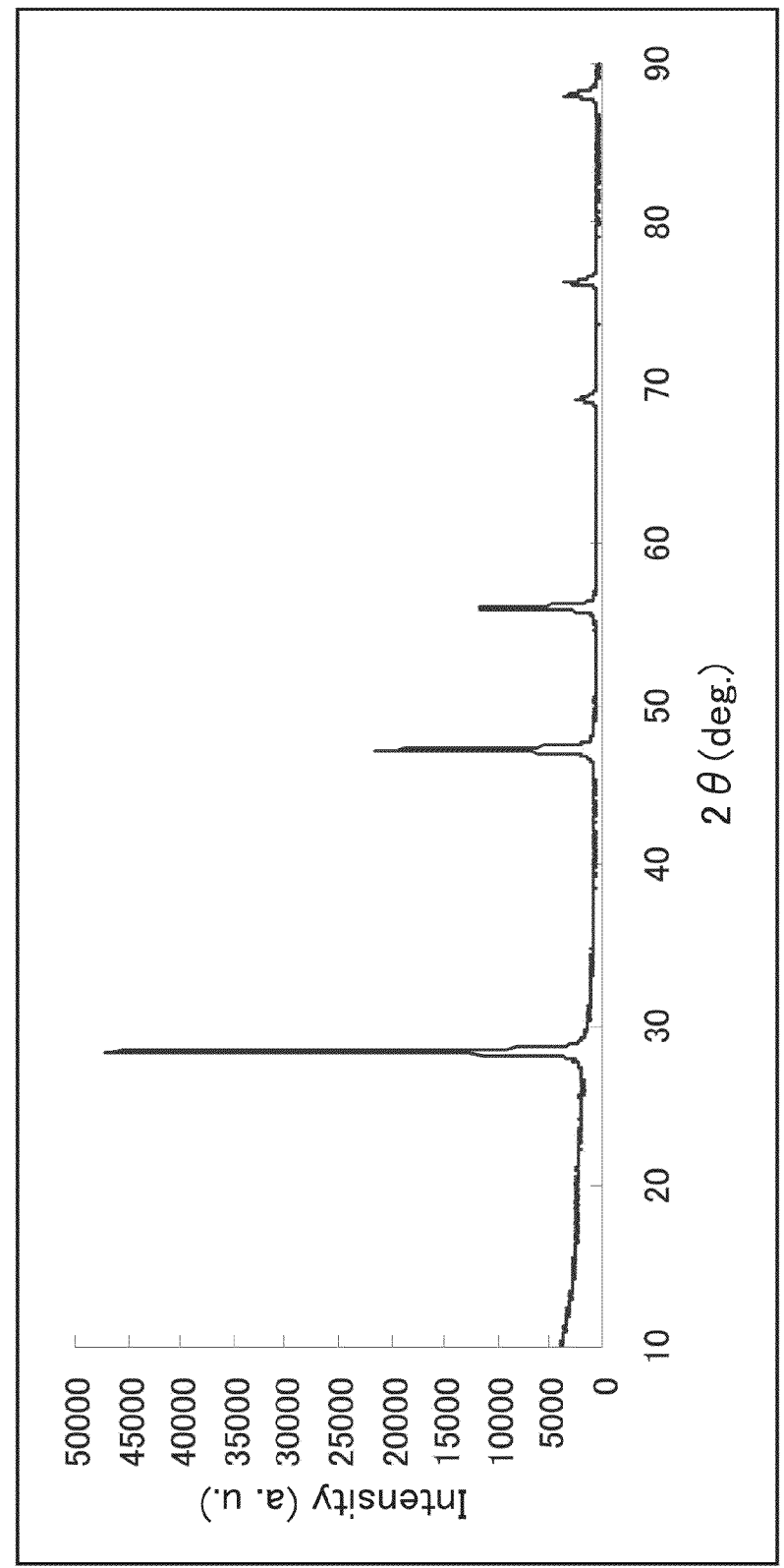
FIG. 6 is a diagram showing results of X-ray diffraction in the Si-carbon composite according to First Comparative Example of the present invention.

The Si—Cu-carbon composite according to First Embodiment, and the Si-carbon composite according to First Comparative Example underwent X-ray diffraction via the CuKα ray. FIG. 5 illustrates results of the X-ray diffraction occurred in the Si—Cu-carbon composite according to First Embodiment. FIG. 6 illustrates results of the X-ray diffraction occurred in the Si-carbon composite according to First Comparative Example. The X-ray diffraction measurement was carried out by a powder X-ray diffractometer (Model Number "M06XCE" produced by MAC Science Corporation). The measurement conditions were as follows: 40-kV voltage; 100-mA current; 4-degree/minute scanning rate; 0.02-degree sampling frequency; one-time cumulated number; and the measurement range of from 10 to 90 degrees by diffraction angle (2θ).

When comparing FIG. 5 with FIG. 6, the drawings were identical with each other, except that the peak "A" and peak "B," which were found respectively at diffraction angle (2θ)= 44.7 degrees and at diffraction angle (2θ)=45.3 degrees in FIG. 5, were not found in FIG. 6. The present inventors believed that any of the peaks, which were found at diffraction angles (2θ)=28.4 degrees, 47.2 degrees, 56.0 degrees, 69.0 degrees, 76.3 degrees and 87.9 degrees in FIG. 5, were peaks corresponding to the nanometer-size Si particles, and observed the same peaks as the above-described peaks in FIG. 6 as well. In FIG. 5 and FIG. 6, since the present inventors did not observe any crystalline peak other than the above-described peaks, the present inventors understood that the other peaks were amorphous peaks. Moreover, in FIG. 5, the present inventors did not ascertain any peak resulting from alloying of the nanometer-size Si particles with copper or from segregated metallic copper. This fact suggests that copper ascertained by the compositional analysis was composited into amorphous carbon.

The peak "A" and peak "B" found in FIG. 5 are novel peaks, and are not any of the peaks resulting from copper, copper alloys, Si, SiC and C. The present inventors believed that the peak "A" and peak "B" were peaks resulting from the phenomenon that copper was taken in as a complex inside carbon. That is, the present inventors presumed that, within a copper/carbon composite matrix, copper was coordination bonded to functional groups which were present on the surface of amorphous carbon or in the interior. Since the copper phthalocyanine and polyamide-imide resin were used as raw materials, the present inventors presumed that the aforementioned functional groups contained N and/or O.

Measurement of Initial Capacity

Figure 7:
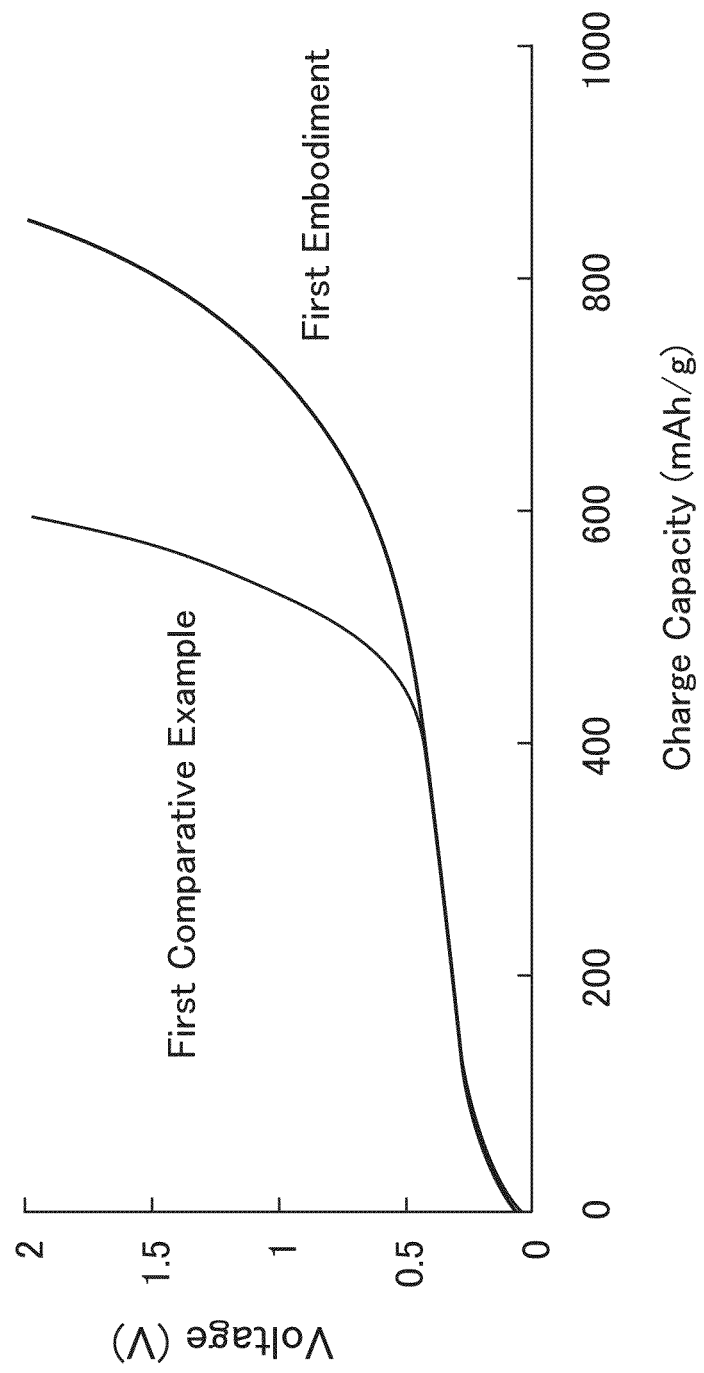
FIG. 7 is a diagram showing a charging curve of a model battery according to First Embodiment of the present invention, and a charging curve of a model battery according to First Comparative Example of the present invention.

The present inventors measured initial capacities of the coin-type model batteries according to First Embodiment and First Comparative Example. The model batteries were discharged with 0.1-mA constant current until the output voltage reached 0.01 V, and were then charged with 0.1-mA constant current until the output voltage reached 2.0 V. A charge capacity obtained by the above operations was measured, and was labeled an initial capacity. FIG. 7 illustrates charging curves of the model batteries according to First Embodiment and First Comparative Example. The charge capacity of the model battery according to First Embodiment was 850 mA/g, whereas the charge capacity of the model battery according to First Comparative Example was 596 mAh/g. Thus, the charge capacity according to First Embodiment became as high as about 1.4 times of the charge capacity according to First Comparative Example.

Measurement of IR Drop

The present inventors measured IR drops of the coin-type model batteries according to First Embodiment and First Comparative Example, and then computed internal resistances of the coin-type model batteries by the Ohm's law. The internal resistance of the model battery according to First Embodiment was 0.9 MΩ, whereas the internal resistance of the model battery according to First Comparative Example was 1.6 MΩ.

From the measured results of the initial capacities and the measured results of the IR drops, the present inventors believed that the lowered internal resistance according to First Embodiment increased the initial capacity considerably. Moreover, from the phenomenon that the internal resistance of the model battery according to First Embodiment lowered more considerably than did the internal resistance of the model battery according to First Comparative Example, the present inventors understood that copper included in the Si—Cu-carbon composite according to First Embodiment contributed to lowering the internal resistance greatly.

The invention claimed is:

1. A negative-electrode active material for nonaqueous-electrolyte secondary battery,
   the negative-electrode active material formed via the steps of mixing nanometer-size Si particles, an organic polymer and an organometallic complex one another to prepare a raw-material mixture, and calcining the raw-material mixture at from 300° C. or more to 1,100° C. or less,
   wherein said organic polymer comprises at least one member selected from the group consisting of acrylic resin, polyamide-imide resin, polyamide resin, and polyimide resin,
   said organometallic complex comprises at least one member selected from the group consisting of copper phthalocyanine, copper acetate, copper alkoxide, copper dithiane, copper trifuluoromethane sulfonate, copper trifluoromethane acetate, Cu-TMEDA complexes, copper diketonate, copper acetonate, copper-salt pyridine complexes, alcian blue complexes, copper-salt ethylenediamine complexes, and copper quinoline complexes,
   the negative-electrode active material comprising an Si—Cu-carbon composite composed of a metal/carbon composite matrix including Cu, amorphous carbon and at least one of N and O, and nanometer-size Si particles dispersed in the metal/carbon composite matrix, the Si—Cu-carbon composite exhibiting a peak in a range where 2θ=from 40 deg. to 48 deg. in X-ray diffraction,
   wherein at least one of said N and O is derived from said organic polymer,
   said Cu is derived from said organometallic complex.

2. The negative-electrode active material for nonaqueous-electrolyte secondary battery as set forth in claim 1, wherein a content rate of said nanometer-size Si particles is from 10% by mass or more to 80% by mass or less when said Si—Cu-carbon composite is taken as 100% by mass.

3. The negative-electrode active material for nonaqueous-electrolyte secondary battery as set forth in claim 1, wherein a compounding rate of said nanometer-size Si particles is from 10% by mass or more to 75% by mass or less when the entirety of said raw-material mixture is taken as 100% by mass.

4. The negative-electrode active material for nonaqueous-electrolyte secondary battery as set forth in claim 1, wherein said organometallic complex comprises copper phthalocyanine.

5. The negative-electrode active material for nonaqueous-electrolyte secondary battery as set forth in claim 4, wherein said organic polymer comprises polyamide-imide resin.

6. A negative electrode for nonaqueous-electrolyte secondary battery,
   the negative electrode comprising the negative-electrode active material for nonaqueous-electrolyte secondary battery as set forth in claim 1.

7. A nonaqueous-electrolyte secondary battery comprising the negative electrode for nonaqueous-electrolyte secondary battery as set forth in claim 6.

* * * * *